United States Patent
Purcell et al.

(10) Patent No.: US 10,936,625 B2
(45) Date of Patent: Mar. 2, 2021

(54) PROGRESSIVE OPTIMIZATION FOR IMPLICIT CAST PREDICATES

(71) Applicant: International Business Machines Corporation, Armonk, NY (US)

(72) Inventors: Terence P. Purcell, Springfield, IL (US); Thomas A. Beavin, Milpitas, CA (US); Christopher J. Crone, San Jose, CA (US); Andrei F. Lurie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 15/855,375

(22) Filed: Dec. 27, 2017

(65) Prior Publication Data

US 2019/0197175 A1 Jun. 27, 2019

(51) Int. Cl.
| | |
|---|---|
| *G06F 16/00* | (2019.01) |
| *G06F 16/28* | (2019.01) |
| *G06F 16/25* | (2019.01) |
| *G06F 16/22* | (2019.01) |
| *G06F 16/242* | (2019.01) |
| *G06F 16/2453* | (2019.01) |

(52) U.S. Cl.
CPC ........ *G06F 16/284* (2019.01); *G06F 16/2272* (2019.01); *G06F 16/2425* (2019.01); *G06F 16/2453* (2019.01); *G06F 16/252* (2019.01)

(58) Field of Classification Search
CPC .. G06F 16/284; G06F 16/2453; G06F 16/252; G06F 16/2272; G06F 16/2425
See application file for complete search history.

(56) References Cited

U.S. PATENT DOCUMENTS

| | | | |
|---|---|---|---|
| 6,081,799 A | 6/2000 | Beavin et al. | |
| 6,571,233 B2 | 5/2003 | Beavin et al. | |
| 7,979,440 B2 | 7/2011 | Fuh et al. | |
| 8,713,048 B2 | 4/2014 | Meijer et al. | |
| 2002/0069193 A1* | 6/2002 | Beavin | G06F 16/24537 |
| 2006/0015483 A1 | 1/2006 | Gownder | |

(Continued)

OTHER PUBLICATIONS

Elkner et al., "How to Think Like a Computer Scientist: Learning with Python 2nd Edition documentation", 2010 (Year: 2010).*

(Continued)

*Primary Examiner* — Mark D Featherstone
*Assistant Examiner* — Kweku William Halm
(74) *Attorney, Agent, or Firm* — Janaki K. Davda; Konrad, Raynes, Davda and Victor LLP

(57) ABSTRACT

Provided are techniques for progressive optimization for implicit CAST predicates. In response to receiving a query with an original predicate comparing a character value of a character data type to a literal value of a numeric data type, a number of iterations is set to a length of the character data type. For each of the number of iterations, prefix predicates are generated based on that iteration and processed to identify a qualified index key in an index. Once the iterations are completed, the character value and the literal value are normalized. The original predicate with the normalized character value and the normalized literal value is applied starting at the qualified index key identified in a last iteration to generate a result set for the query. The result set is returned.

20 Claims, 13 Drawing Sheets

(56) References Cited

U.S. PATENT DOCUMENTS

| | | | | |
|---|---|---|---|---|
| 2007/0276785 | A1* | 11/2007 | Piedmonte | G06F 16/2453 |
| 2009/0259683 | A1* | 10/2009 | Murty | G06F 16/289 |
| 2010/0257153 | A1* | 10/2010 | Day | G06F 16/2453 |
| | | | | 707/715 |
| 2013/0002553 | A1* | 1/2013 | Colley | G06F 3/0236 |
| | | | | 345/161 |

OTHER PUBLICATIONS

Lahiri et al. "Predicate Abstraction with Indexed Predicates" ACM Transactions on Computational Logic (TOCL), vol. 9, Issue 1, p. 4.1-4.28 (Year: 2007).*

Google Search (Year: 2001).*

J.Y. Gil et al., "Simple and safe SQL queries with C++ templates," , In Proceedings of the 6th International Conference on Generative Programming and Component Engineering, dated 2007, Total 23 pages. Retrieved from Internet using: http://www.cs.technion.ac.il/~lkeren/scp.pdf.

S. Scherzinger et al., "Finding and Fixing Type Mismatches in the Evolution of Object-NoSQL Mappings," dated 2016, In EDBT/ICDT Joint Conference on CEUR-WS.org, Total 4 pages. Retrieved from Internet using: http://ceur-ws.org/Vol-1558/paper10.pdf.

Mell, P. and T. Grange, "Effectively and Securely Using the Cloud Computing Paradigm", [online], Oct. 7, 2009 retrieved from the Internet at <URL: http://csrc.nist.gov/groups/SNS/cloud-computing/cloud-computing-v26.ppt>, Total 80 pp.

Mell, P. and T. Grange, "The NIST Definition of Cloud Computing (Draft)", Sep. 2011, Computer Security Division Information Technology Laboratory National Institute of Standards and Technology, Total 7 pp.

* cited by examiner

AND (CHAR9COL LIKE 'b%' <-- leading blank
OR CHAR9COL LIKE '+%' <-- leading plus sign
OR CHAR9COL LIKE '.%' <-- leading decimal point
OR CHAR9COL LIKE '0%' <-- leading zero
OR CHAR9COL LIKE '1%') <-- leading '1'

FIG. 4

AND (CHAR9COL LIKE 'b%' <-- no further processing
OR CHAR9COL LIKE '+%' <-- no further processing
OR CHAR9COL LIKE '.%' <-- no further processing
OR CHAR9COL LIKE '0%' <-- no further processing
OR (CHAR9COL LIKE '1%'
AND (CHAR9COL LIKE '1.%' <-- 2nd character as decimal for floating point representation
OR CHAR9COL LIKE '12%')) <-- 2nd character as next literal value

FIG. 5

```
AND (CHAR9COL LIKE 'b%'       <-- no further processing
OR CHAR9COL LIKE '+%'         <-- no further processing
OR CHAR9COL LIKE '.%'         <-- no further processing
OR CHAR9COL LIKE '0%'         <-- no further processing
OR (CHAR9COL LIKE '1%'
AND (CHAR9COL LIKE '1.%'      <-- no further processing
OR (CHAR9COL LIKE '12%'
AND (CHAR9COL LIKE '12.%'     <-- 3rd character as decimal for floating point representation
OR CHAR9COL LIKE '123%')))    <-- 3rd character as next literal value
```

```
AND (CHAR9COL LIKE 'b%'       <-- no further processing
OR CHAR9COL LIKE '+%'         <-- no further processing
OR CHAR9COL LIKE '.%'         <-- no further processing
OR CHAR9COL LIKE '0%'         <-- no further processing
OR (CHAR9COL LIKE '1%'
AND (CHAR9COL LIKE '1.%'      <-- no further processing
OR (CHAR9COL LIKE '12%'
AND (CHAR9COL LIKE '12.%'     <-- no further processing
OR (CHAR9COL LIKE '123%'
AND (CHAR9COL LIKE '123.%'    <-- 4th character as decimal for floating point representation
OR CHAR9COL LIKE '1234%'))))  <-- 4th character as next literal value
```

```
AND (CHAR9COL LIKE 'b%'           <-- no further processing
OR CHAR9COL LIKE '+%'             <-- no further processing
OR CHAR9COL LIKE '.%'             <-- no further processing
OR CHAR9COL LIKE '0%'             <-- no further processing
OR (CHAR9COL LIKE '1%'            <-- no further processing
AND (CHAR9COL LIKE '1.%'          <-- no further processing
OR CHAR9COL LIKE '12%'            <-- no further processing
AND (CHAR9COL LIKE '12.%'         <-- no further processing
OR (CHAR9COL LIKE '123%')))       <-- no further processing
AND (CHAR9COL LIKE '123.%'        <-- no further processing
OR (CHAR9COL LIKE '1234%')))))    <-- no further processing
AND (CHAR9COL LIKE '1234.%'       <-- 5th character as decimal for floating point representation
OR (CHAR9COL LIKE '12345%')))))   <-- 5th character as next literal value
```

PROGRESSIVE OPTIMIZATION FOR IMPLICIT CAST PREDICATES

FIELD

Embodiments of the invention relate to progressive optimization for implicit CAST predicates.

BACKGROUND

A DataBase Management System (DBMS) may use Structured Query Language (SQL) statements. The SQL statements have evolved into a standard language for DBMS software. The DBMS uses SQL statements for storing and retrieving data in a database. The database is organized into tables that consist of rows (also referred to as tuples or records) and columns (also referred to as fields or attributes) of data.

A table in a database may be accessed using an index. An index is an ordered set of references (e.g., pointers) to the rows in the table. The index is used to access each row in the table using an index key (i.e., one of the fields or attributes of the row, which corresponds to a column). The term "index key" may also be referred to as "key" for an index. Without an index, finding a row requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

For better performance of a SQL statement within a traditional Relational DBMS (RDBMS), matching index access is the access technique used when filtering predicates exist. A filtering predicate may be described as a predicate that reduces the result set by filtering out unqualified rows. Matching index access may be described as the ability to utilize predicates to be applied to one or more index keys to reduce the required search range and, thus, the number of index keys that are evaluated.

Matching index access generally requires a WHERE or ON clause predicate to have consistent datatypes and lengths between the right and left hand side columns and values.

Datatype mismatches (literal to character comparison) for local or join predicates may result in the predicate being unable to match on the index. Such predicates are known as implicit cast or implicit conversions. Customers may be exposed to implicit casts (and thus unable to match on an available index). This may happen if the user fails to enclose literal string in quotes when comparing to a char column, which results in significant regression and more resource usage compared to matching on an available index.

Many RDBMSs support comparisons of unlike datatypes in predicates, such as character comparisons to literal. This is referred to as "implicit cast" or "implicit conversions" within DBMSs. Thus, cast predicates refer to predicates that may need to be converted for comparison. They may be explicitly CAST within the SQL statement, or implicitly CAST by the DBMS, since casting may be useful to ensure the datatypes/lengths match for comparison purposes.

Implicit casts present a challenge in performance for the DBMS because literal values within a character column may be stored in any format (e.g., left or right justified, with blanks filling the remaining characters; with leading zeroes, in a decimal format; or in floating point scientific notation). To perform an accurate comparison of the character column to a literal column, the DBMS first converts both the right and left side values to a common data type, such as decimal floating point, for the comparison. Because the conversion occurs before the comparison, this disables the DBMS from being able to use an available index to match on the predicates, which results in a non-matching scan of the entire index or a scan of the entire table.

Also, indexability is possible by creating an expression index on DECFLOAT(CHAR9COL), but this does not allow for index matching without this targeted index.

SUMMARY

In accordance with embodiments, a computer-implemented method is provided for progressive optimization for implicit CAST predicates. The computer-implemented method comprises: in response to receiving a query with an original predicate comparing a character value of a character data type to a literal value of a numeric data type: setting a number of iterations to a length of the character data type; for each of the number of iterations, generating prefix predicates based on that iteration and processing the prefix predicates to identify a qualified index key in an index; normalizing the character value and the literal value; applying the original predicate with the normalized character value and the normalized literal value starting at the qualified index key identified in a last iteration to generate a result set for the query; and returning the result set.

In accordance with other embodiments, a computer program product is provided for progressive optimization for implicit CAST predicates. The computer program product comprising a computer readable storage medium having program code embodied therewith, the program code executable by at least one processor to perform operations comprising: in response to receiving a query with an original predicate comparing a character value of a character data type to a literal value of a numeric data type: setting a number of iterations to a length of the character data type; for each of the number of iterations, generating prefix predicates based on that iteration and processing the prefix predicates to identify a qualified index key in an index; normalizing the character value and the literal value; applying the original predicate with the normalized character value and the normalized literal value starting at the qualified index key identified in a last iteration to generate a result set for the query; and returning the result set.

In yet other embodiments, a computer system is provided for progressive optimization for implicit CAST predicates. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: in response to receiving a query with an original predicate comparing a character value of a character data type to a literal value of a numeric data type: setting a number of iterations to a length of the character data type; for each of the number of iterations, generating prefix predicates based on that iteration and processing the prefix predicates to identify a qualified index key in an index; normalizing the character value and the literal value; applying the original predicate with the normalized character value and the normalized literal value starting at the qualified index key identified in a last iteration to generate a result set for the query; and returning the result set.

BRIEF DESCRIPTION OF THE SEVERAL VIEWS OF THE DRAWINGS

Referring now to the drawings in which like reference numbers represent corresponding parts throughout:

FIG. 4 illustrates example prefix predicates for a first character in accordance with certain embodiments.

FIG. 5 illustrates example prefix predicates for first and second characters in accordance with certain embodiments.

FIG. 6 illustrates example prefix predicates for first, second, and third characters in accordance with certain embodiments.

FIG. 7 illustrates example prefix predicates for first, second, third, and fourth characters in accordance with certain embodiments.

FIG. 8 illustrates example prefix predicates for first, second, third, fourth, and fifth characters in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments advantageously improve the performance of filtering predicates comparing literal values to character values by supporting matching index access for all viable representations within the character column. Embodiments also improve the performance of case insensitive search utilizing the progressive optimization approach that is applied to implicit cast/conversions.

Figure 1:
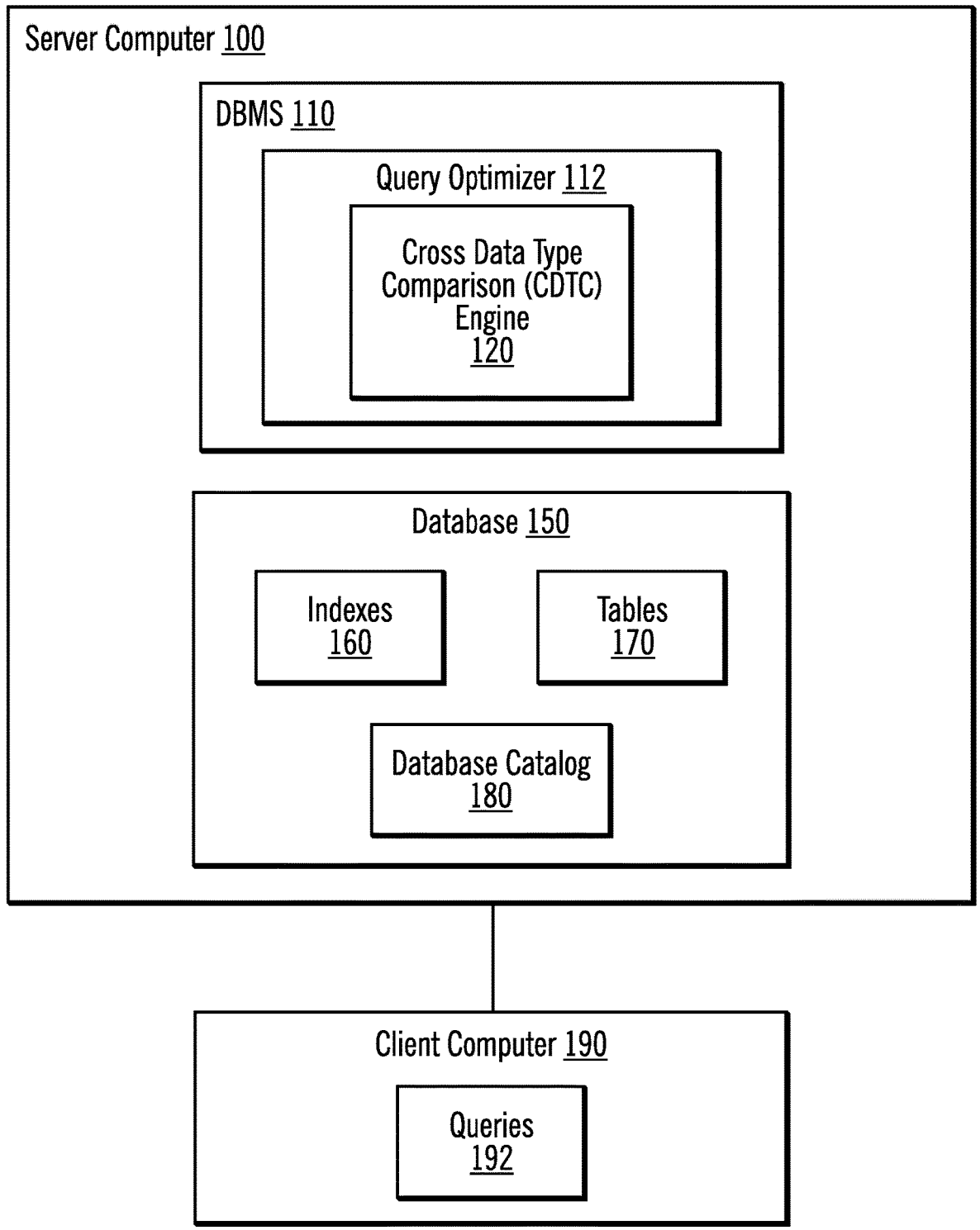
FIG. 1 illustrates, in a block diagram, a computing environment in accordance with certain embodiments.

FIG. 1 illustrates, in a block diagram, a computing environment in accordance with certain embodiments. In FIG. 1, a server computer 100 is coupled to a client computer 190. The server computer 100 includes DataBase Management System (DBMS) 110 and database 150. The client computer 190 issues queries 192 to the server computer 100. The DBMS 110 includes a query optimizer 112, which includes a Cross Data Type Comparison (CDTC) engine 120. The query optimizer 112 and CDTC engine 120 execute the queries 192. The database 150 includes indexes 160, tables 170, and a database catalog 180. Each of the tables 170 may include columns of data types, such as character data type columns and numeric data type columns. The database catalog 180 may be described as tables and indexes owned by the DBMS 110 with, for example, statistical information about other tables.

With conventional systems, for comparison of a character value of a character column (on one side of a comparison operation) to a literal value of a literal column (on the other side of the comparison operator), the character value and the literal value need to be in the same format. For index access, the conversion occurs before the comparison, which disables the capability for matching index access.

Figure 2:
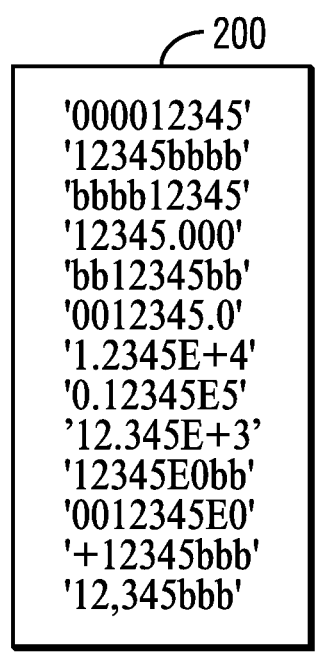
FIG. 2 illustrates an example of a character column with character values in accordance with certain embodiments.

FIG. 2 illustrates an example of character values of a character column 200 in accordance with certain embodiments. As an example, the character column 200 has a length of 9 characters (CHAR9COL defined as CHAR(9)) and a value of 12345 is represented in a WHERE clause predicate as: WHERE CHAR9COL=12345. In the character column, "b" represents a blank. As can be seen, there are a number of variations in the way "12345" may be represented in a character column with a length of 9 characters. With embodiments, there may be other variations of "12345" represented in a character column. With embodiments, the representations of "12345" in a character column may include: blanks or zeroes, interspersed commas, plus or minus signs (depending on value of the number), etc. The representation of "12345" may be as a floating point or decimal representation. With embodiments, commas may be used in an alternate representation for a decimal point. This is common in European representations for literal values. However, in examples herein, decimal point may be used to represent both the decimal point or comma representation to simplify explanation of the described embodiments.

The example combinations of FIG. 2, which are a subset of all possible combinations, makes it expensive to generate all possible combinations for a given literal value to search for. A conventional system converts both left and right side values to an equivalent form to allow the comparison to occur such as:

WHERE DECFLOAT(CHAR9COL)=DECFLOAT (12345)

The CDTC engine 120 generates a prefix predicate ("weakened" predicate) for each prefix, and progressively increase the filtering of subsequent probes based upon the existence of that prefix, and this allows for use of matching index access.

Figure 3:
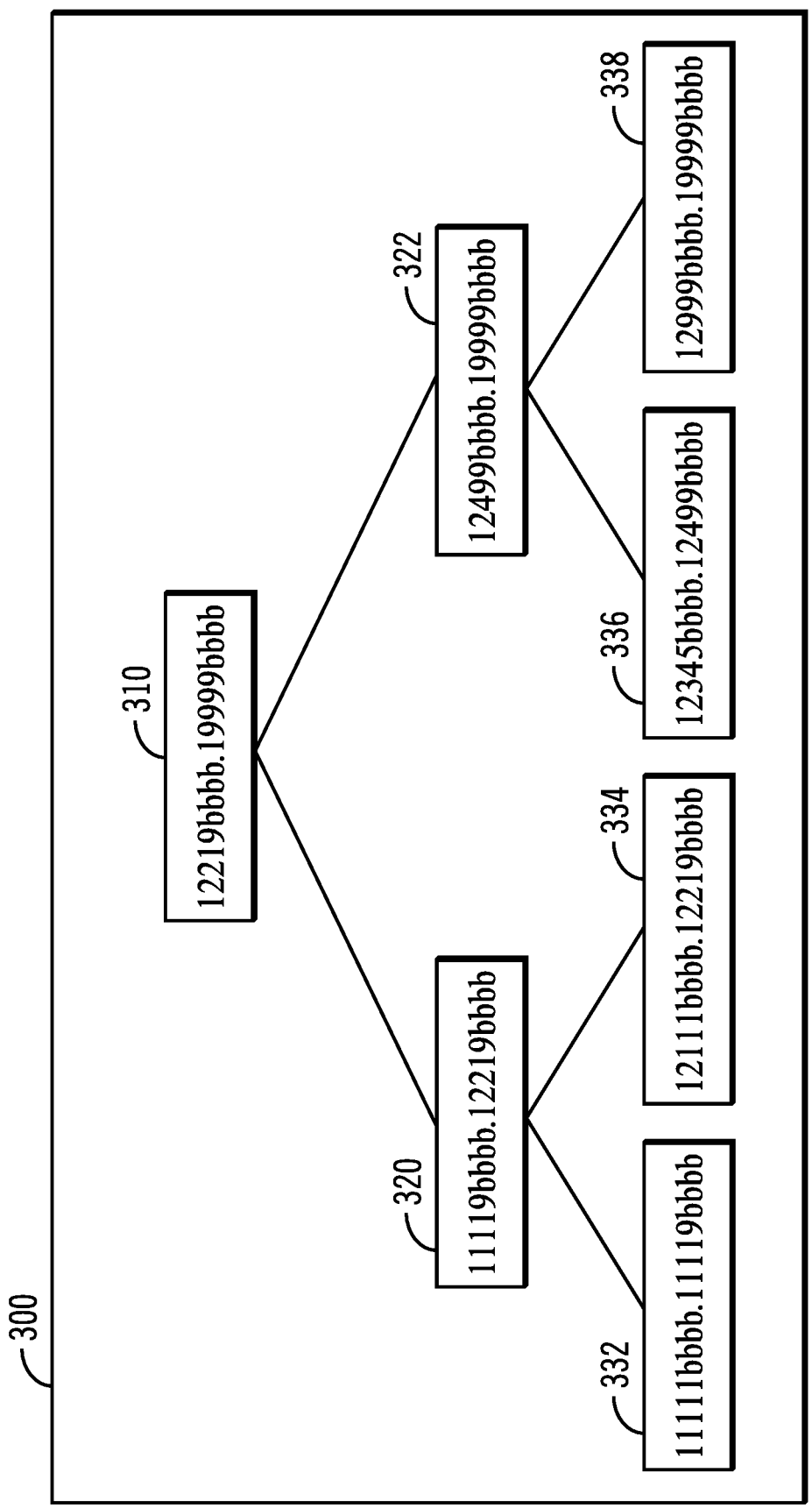
FIG. 3 illustrates a search in an index for a literal value in a character column with trailing blanks in accordance with certain embodiments.

FIG. 3 illustrates a search in an index 300 for a literal value in a character column with trailing blanks in accordance with certain embodiments. In this example, the index 300 is a tree with levels and pages at each of the levels. The index 300 includes a root level with a root page 310, a non-leaf level with pages 320, 322, and a leaf level with pages 332, 334, 336, 338. Each page in the index 300 represents a range of index keys for character values. With embodiments, the CDTC engine 120 locates a particular page in the index 300 and then performs a comparison of the desired literal value with the range of character values. This increases efficiency as all possible character values of other pages need not be compared with the literal value.

FIG. 4 illustrates example prefix predicates 400 for a first character in accordance with certain embodiments. Given an example search of "WHERE CHAR9COL=12345" and the index 300, the CDTC engine 120 generates the prefix predicates 400 for each candidate prefix based upon the length of the literal value compared to the length of the character column. In this example, the character column is nine characters and the literal value contains five digits. Also, for this example, the five digits are left-justified within the character column of length nine. Therefore, there is sufficient space within the character string for different viable formats to be represented. The CDTC engine 120 generates the prefix predicates 400 for the purpose of an existence check. That is, each probe by the CDTC engine 120 looks for the existence of the prefix in the prefix predicate in a page of the index 300, and does not need to determine the total number of qualified rows for the prefix. In the prefix predicates, "%" represents that there are other characters that may follow. That is, this round of prefix predicates 400 is focused on matching the first character.

With embodiments, the execution sequence of the index probes using the prefix predicates 400 are ordered in ascending sequence of the index keys. Generating prefix predicates are in index key sequence ensures probes access the same or consecutive pages where possible. In the example herein, the prefix predicates 400 are in sequential order given American Standard Code for Information Interchange (ASCII) encoding. For Extended Binary Coded Decimal Interchange Code (EBCDIC), "+" and '.' prefix predicates are reversed to maintain ascending sequence.

The CDTC engine 120 utilizes the first prefix predicate (CHAR9COL LIKE 'b %') to probe the index 300 and finds that zero rows qualify. This prefix predicate is ignored for further evaluation.

If the CDTC engine 120 issues a probe with a prefix predicate and does not find a qualifying row for that prefix (i.e., search key), but the current index key position is on the next highest index key, then each subsequent prefix predicate is initially compared to the current index key. For this example, the next highest index key is 11111bbbb of page 332 in the index 300 after the first prefix predicate does not find a qualifying row. If the next prefix predicate is less than the current index key, then this next prefix predicate may be skipped without an additional index probe.

Continuing with the example, the CDTC engine 120 compares the second predicate (CHAR9COL LIKE '+%') to the current index key (11111bbbb) and, since the index key is larger, skips an additional index probe for this second prefix predicate. This second prefix predicate therefore also qualifies zero rows.

The CDTC engine 120 compares the third predicate (CHAR9COL LIKE '.%') to the current index key (11111bbbb) and, since the index key is larger, skips an additional index probe for this third prefix predicate. This third predicate therefore also qualifies zero rows.

Also, the CDTC engine 120 compares the fourth prefix predicate (CHAR9COL LIKE '0%') to the current index key (11111bbbb) and, since the index key is larger, skips an additional index probe for this fourth prefix predicate. This fourth predicate therefore also qualifies zero rows.

Thus, the second, third, and fourth predicates are ignored for further evaluation.

Next, the CDTC engine 120 matches the fifth predicate (CHAR9COL LIKE '1%') to the current index key, and, thus, does not require an additional index probe. This fifth prefix does qualify this prefix predicate for further evaluation.

FIG. 5 illustrates example prefix predicates 500 for first and second characters in accordance with certain embodiments. With embodiments, the progressive filtering probes are generated for the matching prefix to extend to matching of the second character. However, the prefixes of prefix predicates that were not found for matching of the first character do not progress to the second character comparison and are identified in the prefix predicates 500 with: "no further processing".

The next candidate index probes include the prefix for the first two characters based upon the qualified prefix predicates from the first character match. The CDTC engine 120 compares the prefix predicate from this iteration (CHAR9COL LIKE '1.%') to the current index key (11111bbbb) to determine whether a probe of the index 300 may be avoided. Since the current index key is greater than this prefix, the CDTC engine 120 determines that this probe may be skipped and zero rows are qualified. The CDTC engine 120 compares the prefix predicate (CHAR9COL LIKE '12%') to the current index key (11111bbbb) and determines that the prefix predicate is greater than the current index key and that a new index probe is to be performed. The CDTC engine 120 performs the index probe of the index 300 and finds a match to index key 12111bbbb of page 334.

Further progression of the filtering range ignores the unqualified value and extends the qualified value for the third character of the qualified predicate. FIG. 6 illustrates example prefix predicates 600 for first, second, and third characters in accordance with certain embodiments.

The CDTC engine 120 compares the prefix predicate (CHAR9COL LIKE '12.%') to the current index key 12111bbbb, and since the current index key is greater than the predicate, this prefix predicate qualifies zero rows and is ignored for further evaluation. The CDTC engine 120 then compares the prefix predicate (CHAR9COL LIKE '123%') to the current index key 12111bbbb and determines that the prefix predicate is greater than the current index key and that a new index probe is to be performed. The CDTC engine 120 performs the index probe of the index 300 and finds a match to index key 12345bbbb of page 336.

FIG. 7 illustrates example prefix predicates for first, second, third, and fourth characters in accordance with certain embodiments. In FIG. 7, AND (CHAR9COL LIKE '123.%' and OR (CHAR9COL LIKE '1234%')))) have been added.

FIG. 8 illustrates example prefix predicates for first, second, third, fourth, and fifth characters in accordance with certain embodiments. In FIG. 8, AND (CHAR9COL LIKE '1234.%' and OR (CHAR9COL LIKE '12345%'))))) have been added. However, given that the current index key equals the full literal in the predicate after the probe for the third prefix, with embodiments, there is no need to iterate through the fourth and fifth prefixes.

This process continues for the fourth character and the fifth character in a similar manner as has been demonstrated for the iterations for the first, second, and third characters. In this example, no further probes are required since the third character provides the current index key that also qualifies the fourth and fifth characters.

In this example, there are five digits provided with the literal, and given that the first fully qualified index key also matches the leftmost five characters, the remaining characters within the CHAR9COL may contain any form of trailing blanks, decimal notation, floating point or decimal floating point.

Once the significant digits are matched (the five digits of "12345" in this example), then the CDTC engine 120 reverts to applying the original predicate that includes the conversion to normalize both the left and right values, such as with:

DECFLOAT(CHAR9COL)=DECFLOAT(12345)

The CDTC engine 120 or the query optimizer 112 applies the original predicate to the index keys that qualify from the progressive filtering predicate (CHAR9COL LIKE '12345%'). In particular, the original predicate is applied to the index keys represented by page 336 in the index 300. Also, the normalization process will address any of the variations in the trailing four characters of the index key columns.

While the example involved five digits stored as left-justified within a character column of length nine, it should be apparent that this progressive optimization approach of progressively iterating through the candidate prefixes may address any format of representing literal values within a character column.

For situations in which the number of digits exactly match the character length, such as CHAR9COL=123456789, this may easily be mapped to become CHAR9COL='123456789' because there is no opportunity to represent these digits in any other form within the character column. However, if the literal contains either leading or trailing zeroes, then it cannot be assumed that the value is stored as coded in the predicate. For example, CHAR9COL=000012345 may be stored in any form where 12345 is permitted, and, thus, the progressive optimization approach considers all variations. Similarly, CHAR9COL=123450000 may be stored as floating point (1.2345E+8, 0.12345E+9 or other variations) or with a leading sign (+ or 1) such that the progressive optimization approach (with progressive index probes and progressive filtering) is preferred.

It should also be noted that while the examples demonstrate literal values, this progressive optimization approach equally applies to join predicates. In this case, the progressive optimization approach is applied for each join value.

Embodiments also enable reverting index choice for non-filtering predicates. There may be scenarios in which the available predicates do not result in sufficient filtering such that matching index access while iterating through each prefix is not the most efficient access path. While this problem exists traditionally in query optimization when the literal values are not known at plan selection time, it is often mitigated when a query contains literals and the statistics in the database catalog 180 allow the query optimizer 112 to better estimate the filtering. With implicit cast/conversion, the literal may not match the internal representation, making accurate estimation difficult. Since the CDTC engine 120 performs each index probe for a new prefix, the CDTC engine 120, with each probe of the index, may record the higher level non-leaf level (index key) information to approximate the total filtering of that predicate to determine whether the access path should revert to a table scan due to poor index filtering (large number of index keys/RIDs qualified). Such information may be tracked for the DBMS 110 for reducing index tree traversal.

With embodiments, each non-leaf level in a regular b-tree index, such as index 300, stores the high index key of each lower level page. Thus, for each new probe, it can be determined at each level whether the same index key (or same prefix) spans multiple pages. For the initial probe of CHAR9COL LIKE '1%', the CDTC engine 120 determines from the root page that all rows in the index qualify. When the next probe qualifies for CHAR9COL LIKE '12%', the CDTC engine 120 determines that two branches of the 2nd-level non-leaf level qualify, but less than the full index qualifies. After progressing to the third probe for CHAR9COL LIKE '123%', the CDTC engine 120 determines that only one page of the index at the leaf level qualifies.

Once the full match is qualified (that is—all five digits in this example), if it is still determined that a large percentage of the index qualifies, then the query optimizer 112 may decide to revert to a table scan or non-matching index scan of an alternate index (such as an index that results in index-only access) rather than to continue with filtering using the prefix predicates.

With embodiments, the break-even point when a full scan outperforms matching index access may be different for each implementation, but it is typically greater than 10% filtering for an unclustered index and 25-30% for a clustering index.

This provides additional protection from query regression, since implementations today that cannot perform matching index access with implicit cast/conversion predicates may perform a full scan, and the goal is to improve performance and minimize regression risk. In particular, it is possible that users or programmers may not know that they are using an incorrect data type for their comparison, and, even if the SQL statement is valid, they may not know the negative performance implications of their data type choice. That is, the user or developer may code an SQL statement that contains a datatype mismatch that results in a full table scan, even if the user provides a WHERE clause predicate that qualifies a small number of rows. Such an SQL statement will successfully complete, but can consume a large amount of resources to complete. The progressive optimization approach provides a solution that allows datatype mismatch predicates to utilize an index and reduce resource consumption.

An additional usage of this invention applies to case insensitive searches, such as those including the UPPER or UCASE function as in the example: WHERE UPPER (LASTNAME)='SMITH'. This allows searches on values where the data is stored as a mix of upper and lower case, or if it is unknown what combination of upper and lower case is used for storing the data. With embodiments, a query having a predicate that compares a value having a combination of upper case and lower case elements is received, and embodiments perform a case insensitive search.

To achieve matching index access for such predicates, a conventional system may utilize an expression based index.

Using the progressive optimization approach, this example would become:

WHERE UPPER(LASTNAME)='SMITH'
AND (LASTNAME LIKE 'S %'
OR LASTNAME LIKE 's %')

Based upon the success or failure of the LASTNAME LIKE predicates to qualify a row, the filtering would progress to the second character, which may also be a mix of upper or lower case such as:

WHERE UPPER(LASTNAME)='SMITH'
AND ((LASTNAME LIKE 'S %'
AND (LASTNAME LIKE 'SM %' OR LASTNAME LIKE 'Sm %'))
OR (LASTNAME LIKE 's %'
AND (LASTNAME LIKE 'sM %' OR LASTNAME LIKE 'sm %')))

This progressive optimization approach would continue to iterate through the third, fourth, and fifth characters for any prefix that qualifies at least one row.

Also, while embodiments target implicit cast/conversion predicates to provide performance improvements, it should be noted that the progressive optimization approach may apply to any situation in which an ordered list of index probes occurs, such as a sorted IN-list or a join where there is guaranteed order from the outer table to the inner index. With the progressive optimization approach, the initial probe uses a subset of the index key length to probe and determine existence using this prefix.

Embodiments evaluate a literal value that is being compared to a character column and progressively optimize the predicate to exploit matching index access of each viable prefix and progressively increase the filtering value for each subsequent index probe based upon the existence of a match to the initial prefix. The prefix probes take into consideration the literal value length and the character column length.

Unlike conventional systems, with embodiments, matching index access may be exploited to significantly reduce the number of qualified rows, when compared to applying the DECFLOAT conversion to each row before evaluating the predicate comparison. Embodiments also do not require targeted indexes to be created for indexability of such predicates. Embodiments, utilize the progressive optimization approach to enhance the performance of case insensitive searches without the need for expression based indexes.

Embodiments use the higher level index non-leaf level information to determine whether a large number of index keys share the same prefix or not. If they do, then this implies that a large number of index keys will need to be processed using the progressive optimization approach, and a decision may be made to revert to the original implementation of scanning all rows. That is, during index traversal and binary search at each level, it is possible to detect how many index keys on each level share the same prefix. This allows reversion to a different plan choice. For example, a nested loop join to inner table may switch to building a sparse index on the inner so that the inner is scanned once and all index keys converted to DECFLOAT, rather than iterating through the prefixes and converting index keys each probe.

After a successful probe, embodiments iterate through each subsequent character (when found) to maintain index key position before moving to a next disjunct (OR predicate). Also, if a probe is not successful (i.e., prefix is not found), then a next probe will first compare the current index key before attempting a new probe. With embodiments, if an index key is greater, then the probe is avoided. Also, with embodiments, within a query and inner table of a join not found on common prefixes (such a 'b', '+', or '0') may be remembered to avoid those for subsequent probes. Moreover, if a literal length matches a column length, and there are no leading or trailing zeroes, the predicate may match without requiring progressive iteration.

Figure 9:
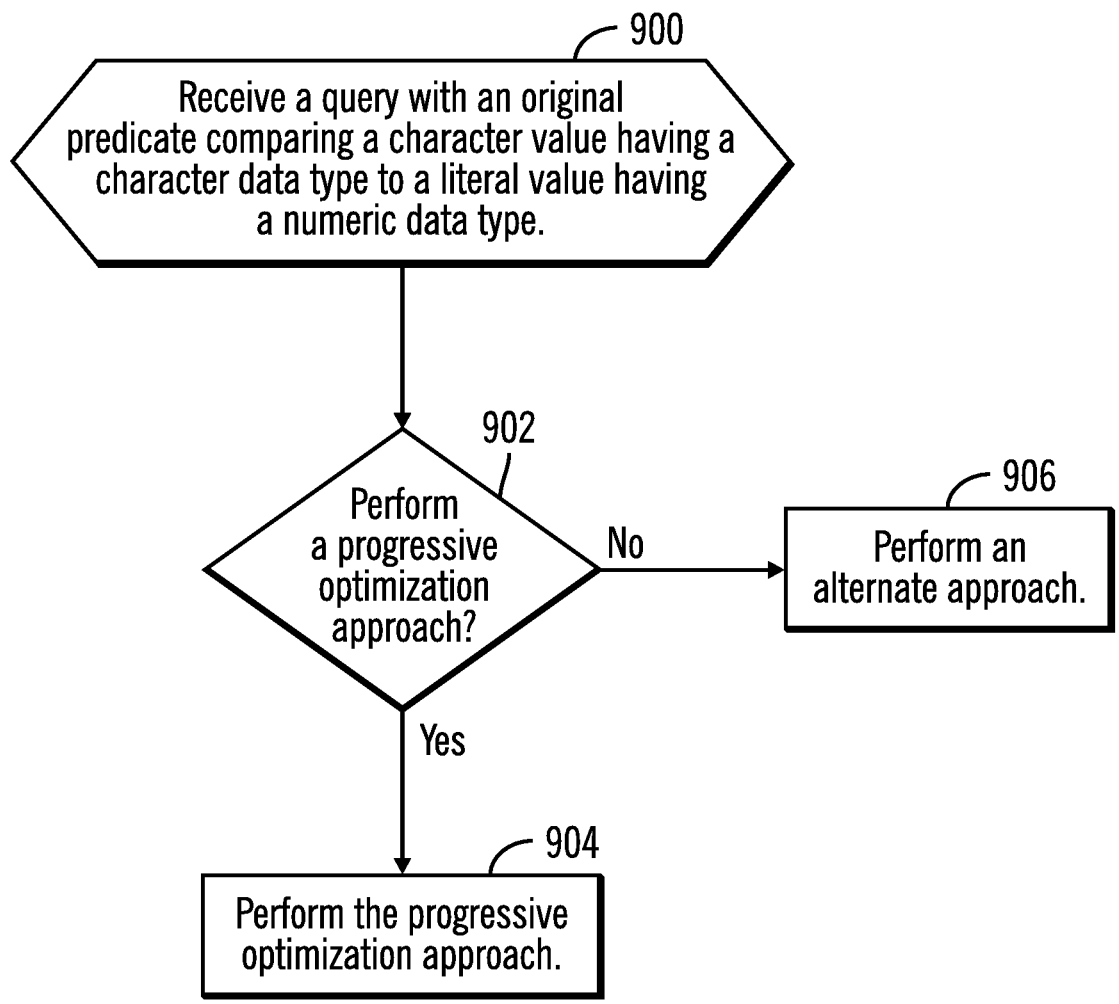
FIG. 9 illustrates, in a flow chart, operations for determining whether to perform a progressive optimization approach in accordance with certain embodiments.

FIG. 9 illustrates, in a flow chart, operations for determining whether to perform a progressive optimization approach in accordance with certain embodiments. With embodiments, this is done before starting execution of the predicate comparing the character data type to the numeric data type. Control begins at block 900 with the CDTC engine 120 receiving a query with an original predicate comparing a character value having a character data type to a literal value having a numeric data type. In block 902, the CDTC engine 120 determines whether to perform a progressive optimization approach. If so, processing continues to block 904, otherwise, processing continues to block 906. In block 904, the CDTC engine 120 performs the progressive optimization approach. In block 906, the CDTC engine 120 performs an alternate approach.

Figure 10A:
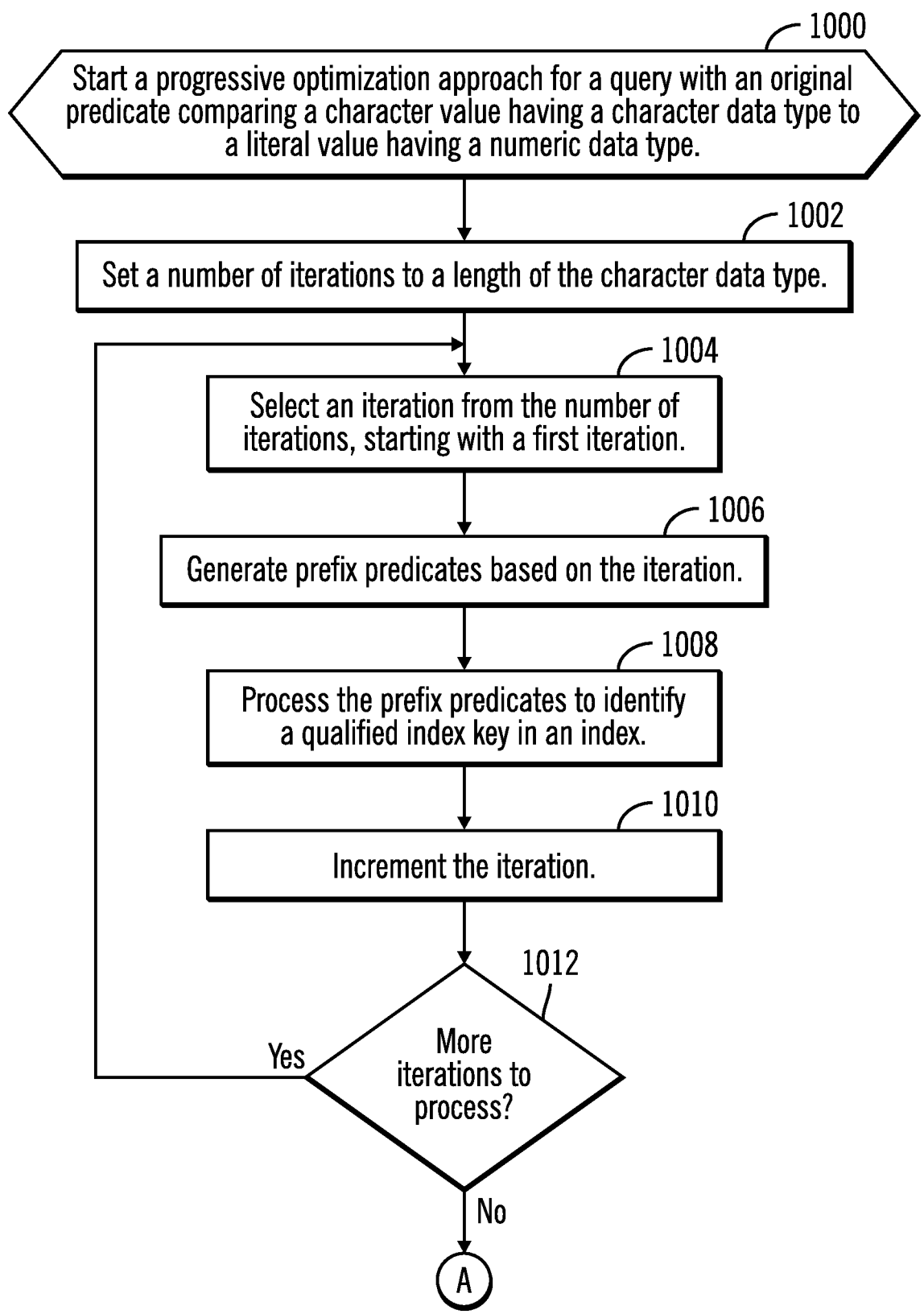
FIGS. 10A and 10B illustrate, in a flow chart, operations for iterations of a progressive optimization approach in accordance with certain embodiments.
Figure 10B:
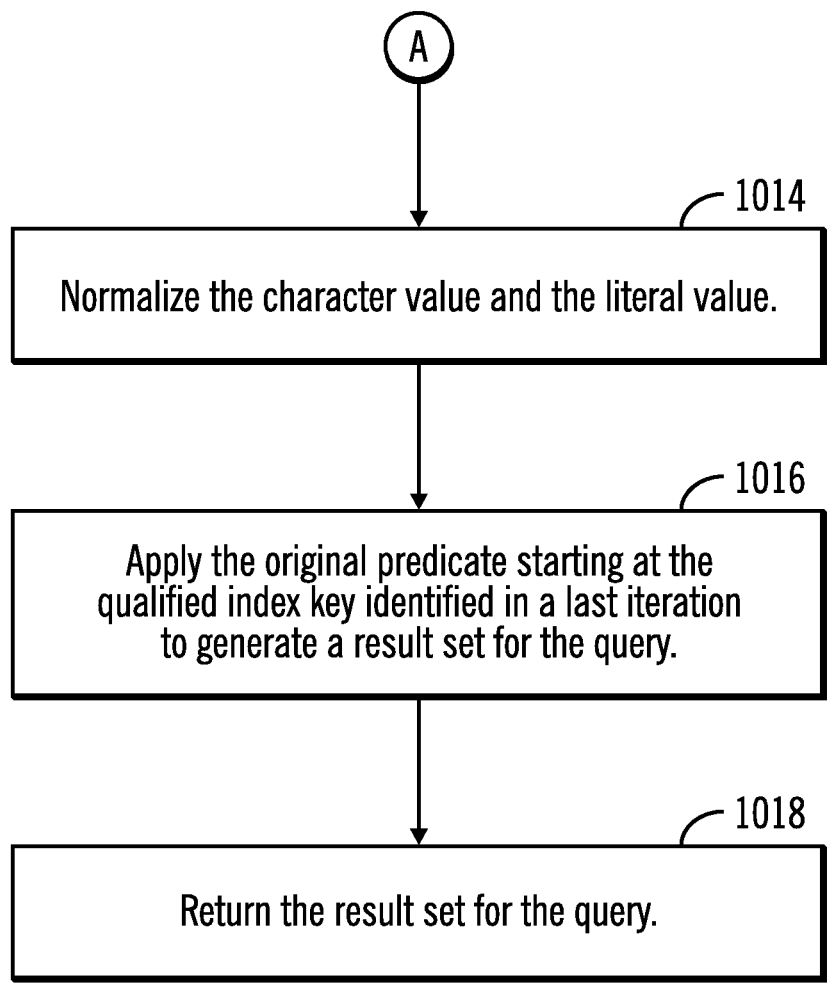

FIGS. 10A and 10B illustrate, in a flow chart, operations for iterations of a progressive optimization approach in accordance with certain embodiments. Control begins at block 1000 with the CDTC engine 120 starting a progressive optimization approach for a query with an original predicate comparing a character value having a character data type to a literal value having a numeric data type.

In block 1002, the CDTC engine 120 sets a number of iterations to a length of the character data type. In block 1004, the CDTC engine 120 selects an iteration from the number of iterations, starting with a first iteration. In block 1006, the CDTC engine 120 generates prefix predicates based on the iteration. For example, for a first iteration, the prefix predicates are for a first literal; for a second iteration, the prefix predicates are for the first two literals; etc.

In block 1008, the CDTC engine 120 processes the prefix predicates to identify a qualified index key in an index. With embodiments, the CDTC engine 120 determines a starting index key (i.e., a starting position), and the DBMS 110 processes index keys from that starting index key. In block 1010, the CDTC engine 120 increments the iteration. In block 1012, the CDTC engine 120 determines whether there are more iterations to process. If so, processing loops back to block 1004, otherwise, processing continues to block 1014 (FIG. 10B).

In block 1014, the CDTC engine 120 normalizes the character value and the literal value. In block 1016, the CDTC engine 120 applies the original predicate starting at the qualified index key identified in a last iteration to generate a result set for the query. That is, the original predicate is executed against the index starting at the qualified index key. In block 1018, the CDTC engine 120 returns the result set for the query. With embodiments, the result set is returned from the CDTC engine 120 to the DBMS 110, which may perform additional processing, such as executing other predicates of the query.

Figure 11:
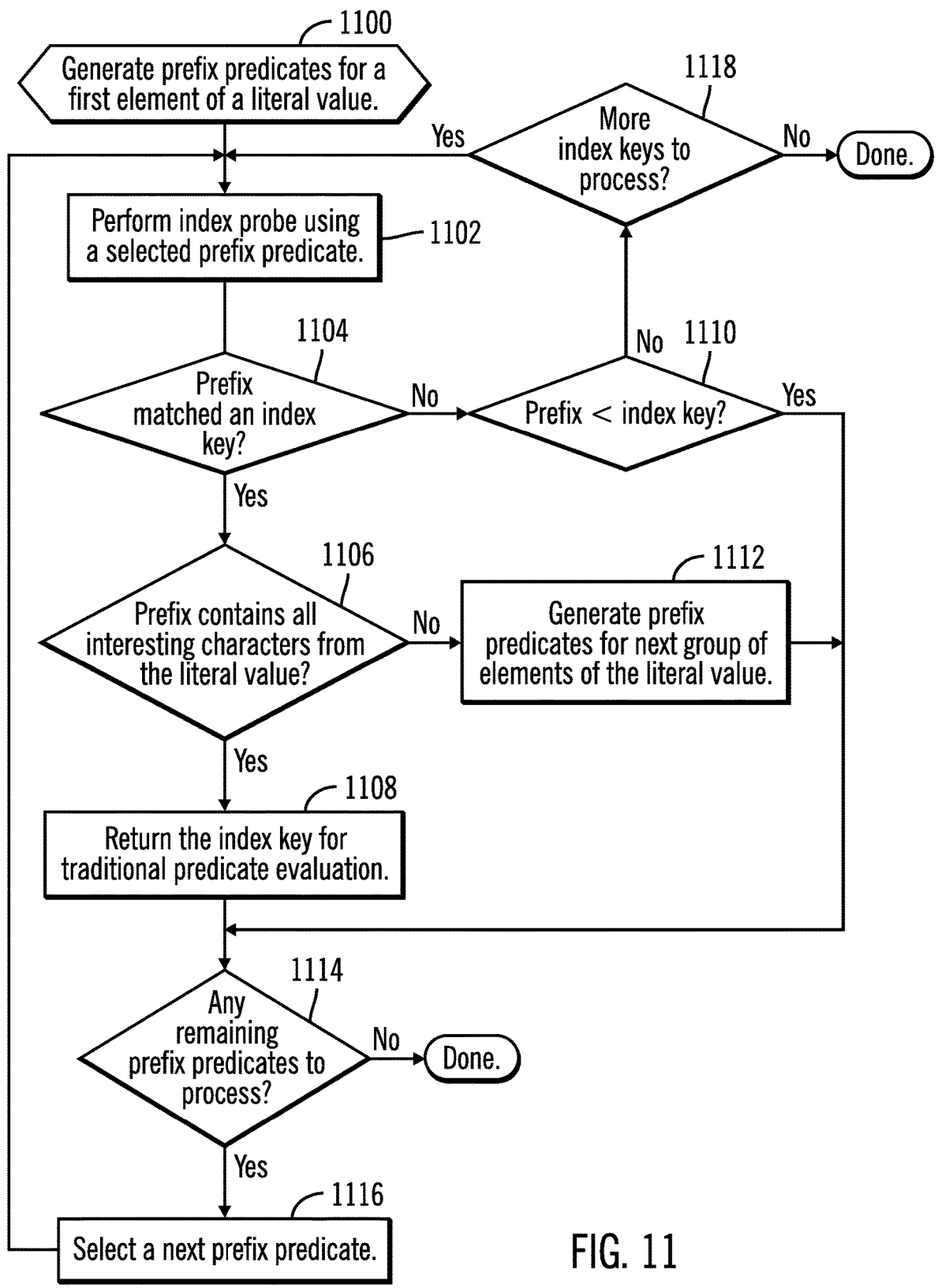
FIG. 11 illustrates, in a flow chart, operations for generating prefix predicates for an iteration of a progressive optimization approach in accordance with certain embodiments.

FIG. 11 illustrates, in a flow chart, operations for generating prefix predicates for an iteration of a progressive optimization approach in accordance with certain embodiments. Control begins at block 1100 with the CDTC engine 120 generates prefix predicates for a first element of a literal value. For example, if the literal value is "12345", each number in the literal value is an element, and the CDTC engine 120 generates prefix predicates for the first element, which may be any of the following: —"b" (blank), "+", ".", "0", or "1".

In block 1102, the CDTC engine 120 performs index probe using a selected prefix predicate. With embodiments, a first prefix predicate of the generated prefix predicates is selected first, then each subsequent prefix predicate of the generated prefix predicates is selected in order.

In block 1104, the CDTC engine 120 determines whether the prefix of the selected prefix predicate matched an index key (i.e., the prefix equals the index key and is a qualified index key). If so, processing continues to block 1106, otherwise, processing continues to block 1112.

In block 1106, the CDTC engine 120 determines whether the prefix of the selected predicate contains all interesting characters from the literal value. With embodiments, the "interesting" characters are the ones desired to be matched and may exclude blanks and other characters. For example, in a literal value of "bb12345bb", where blanks do not need to be matched, the interesting characters are "12345". If so, processing continues to block 1108, otherwise, processing continues to block 1114. For example, if the literal value is "12345", and the prefix matches the literal value length of 5, then, processing continues to block 1108.

In block 1108, the CDTC engine 120 returns the qualified index key for traditional predicate evaluation. Then, processing is done for that index key and processing continues to block 1114. With embodiments, this index key has been qualified and is returned by the CDTC engine 120 to the DBMS 110, and the DBMS 110 may then perform other processing (e.g., process other predicates).

In block 1110, the CDTC engine 120 determines whether the prefix of the selected prefix predicate is less than the index key. If so, processing continues to block 1114, otherwise, processing continues to block 1118.

In block 1112, the CDTC engine 120 generates prefix predicates for next group of elements of the literal value. For example, if the literal value is "12345", and the last group of elements was for the first character, then the next group of elements is for the second character. If the last group of elements included all characters of the literal predicate, then there is no other group of elements, and all prefix predicates have been processed. From block 1112, processing continues to block 1114.

In block 1114, the CDTC engine 120 determines whether there are any remaining prefix predicates to process. If so, processing continues to block 1116, otherwise, processing is done.

In block 1116, the CDTC engine 120 selects a next prefix predicate and processing continues to block 1102.

In block 1118, the CDTC engine 120 determines whether there are more index keys to process. If so, processing continues to block 1102, otherwise, processing is done (even if there are other prefix predicates that have not been processed yet).

Embodiments focus on implicit casting by the DBMS, as well as, explicit casting if that casting matches what the DBMS would perform implicitly.

Although examples herein refer to literals, embodiments are applicable to literals, program variables, and joined columns—all of numeric data type.

Figure 12:
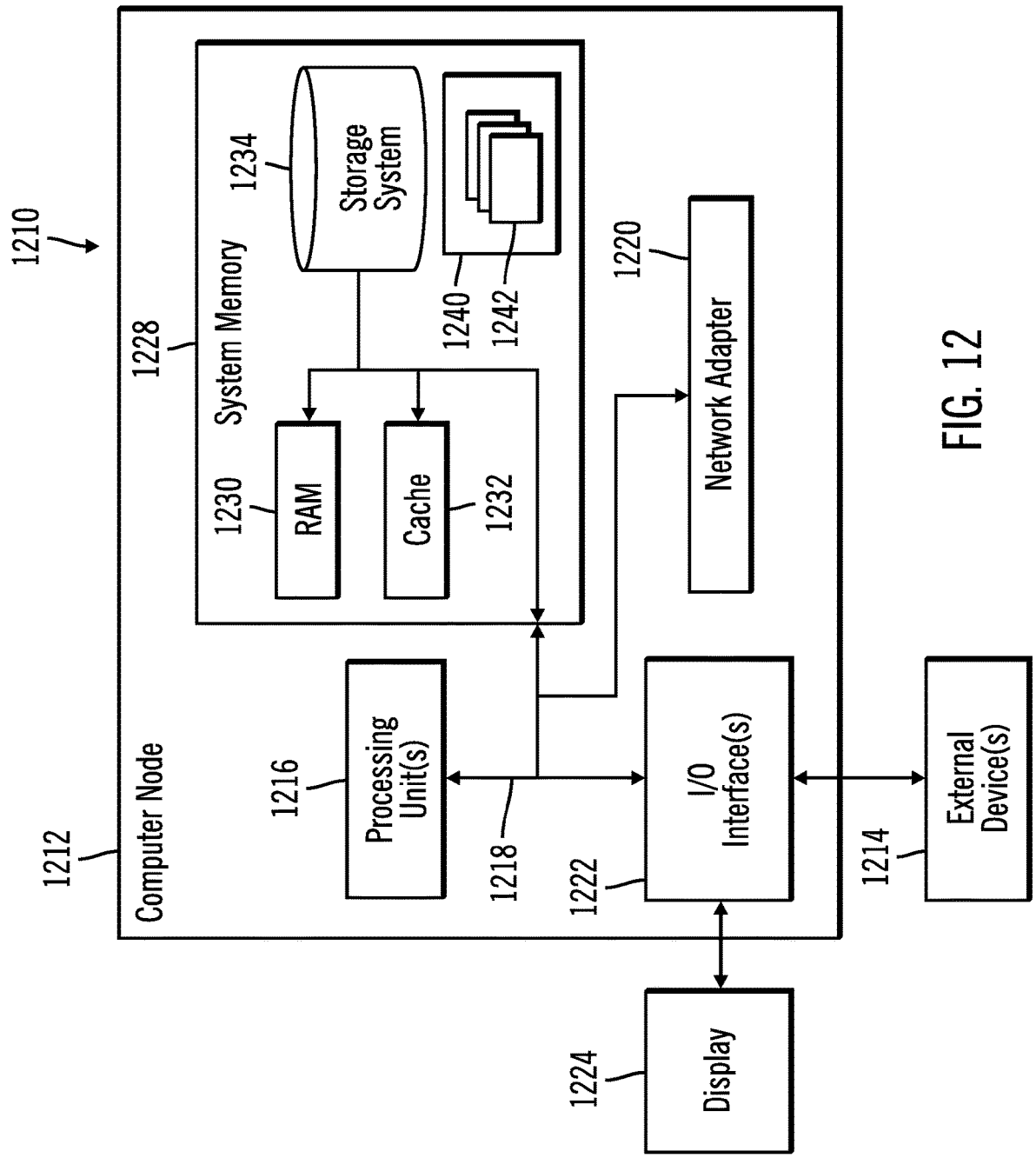
FIG. 12 illustrates a computing node in accordance with certain embodiments.

FIG. 12 illustrates a computing environment 1210 in accordance with certain embodiments. In certain embodiments, the computing environment is a cloud computing environment. Referring to FIG. 12, computer node 1212 is only one example of a suitable computing node and is not intended to suggest any limitation as to the scope of use or functionality of embodiments of the invention described herein. Regardless, computer node 1212 is capable of being implemented and/or performing any of the functionality set forth hereinabove.

The computer node 1212 may be a computer system, which is operational with numerous other general purpose or special purpose computing system environments or configurations. Examples of well-known computing systems, environments, and/or configurations that may be suitable for use with computer node 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1212 may be described in the general context of computer system executable instructions, such as program modules, being executed by a computer system. Generally, program modules may include routines, programs, objects, components, logic, data structures, and so on that perform particular tasks or implement particular abstract data types. Computer node 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer node 1212 is shown in the form of a general-purpose computing device. The components of computer node 1212 may include, but are not limited to, one or more processors or processing units 1216, a system memory 1228, and a bus 1218 that couples various system components including system memory 1228 to one or more processors or processing units 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1212 typically includes a variety of computer system readable media. Such media may be any available media that is accessible by computer node 1212, and it includes both volatile and non-volatile media, removable and non-removable media.

System memory 1228 can include computer system readable media in the form of volatile memory, such as random access memory (RAM) 1230 and/or cache memory 1232. Computer node 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, system memory 1228 may include at least one program product having a set (e.g., at least one) of program modules that are configured to carry out the functions of embodiments of the invention.

Program/utility 1240, having a set (at least one) of program modules 1242, may be stored in system memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer node 1212 may also communicate with one or more external devices 1214 such as a keyboard, a pointing device, a display 1224, etc.; one or more devices that enable a user to interact with computer node 1212; and/or any devices (e.g., network card, modem, etc.) that enable computer node 1212 to communicate with one or more other computing devices. Such communication can occur via Input/Output (I/O) interfaces 1222. Still yet, computer node 1212 can communicate with one or more networks such as a local area network (LAN), a general wide area network (WAN), and/or a public network (e.g., the Internet) via network adapter 1220. As depicted, network adapter 1220 communicates with the other components of computer node 1212 via bus 1218. It should be understood that although not shown, other hardware and/or software components could be used in conjunction with computer node 1212. Examples, include, but are not limited to: microcode, device drivers, redundant processing units, external disk drive arrays, RAID systems, tape drives, and data archival storage systems, etc.

In certain embodiments, the server computer 100 and the client computer 190 each have has the architecture of computer node 1212. In certain embodiments, the server computer 100 and the client computer 190 are part of a cloud infrastructure. In certain alternative embodiments, the server computer 199 and the client computer 190 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
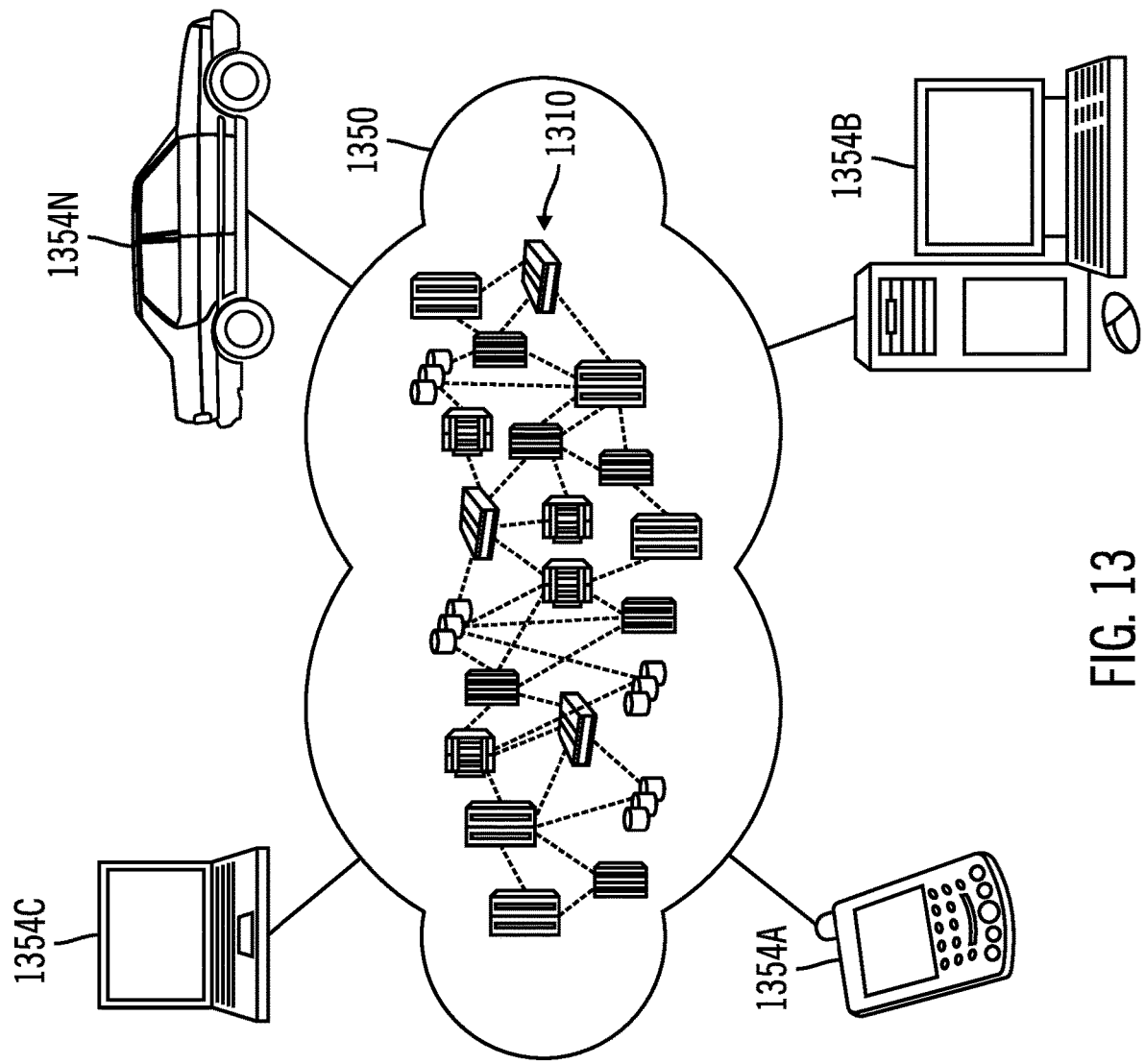
FIG. 13 illustrates a cloud computing environment in accordance with certain embodiments.

Referring now to FIG. 13, illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
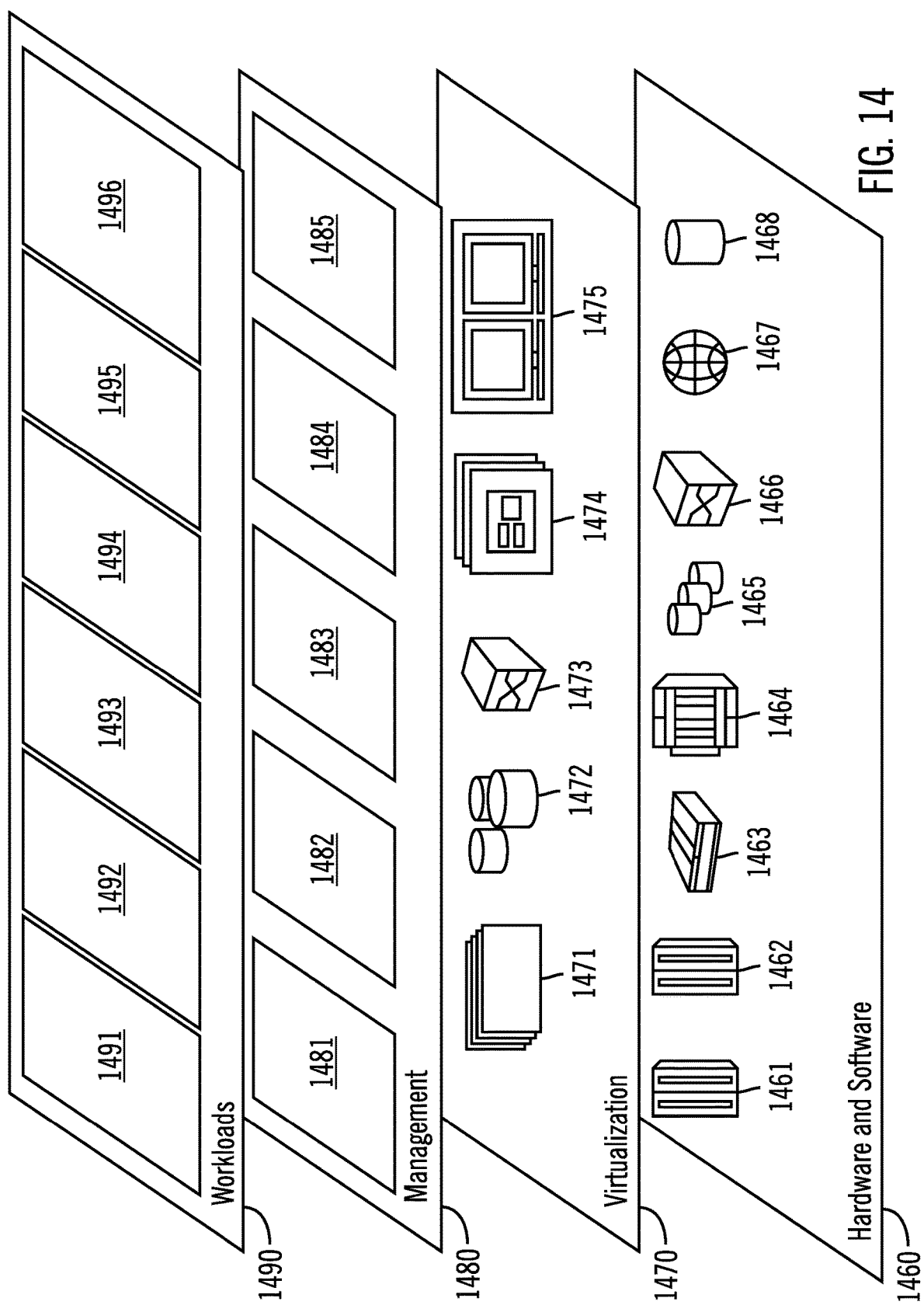
FIG. 14 illustrates abstraction model layers in accordance with certain embodiments.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators.

Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and progressive optimization for implicit CAST predicates 1496

Thus, in certain embodiments, software or a program, implementing progressive optimization for implicit CAST predicates in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart to and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:

in response to receiving a query with an original predicate comparing a character value of a character data type to a literal value of a numeric data type, determining where to start a search in an index by:

for each of a number of iterations, generating prefix predicates for a prefix for that iteration; and processing the prefix predicates to identify a qualified index key in the index for that iteration; and wherein a first iteration comprises:

generating first prefix predicates for a first element of the literal value, wherein each of the first prefix predicates includes a candidate prefix of a plurality of candidate prefixes; and in response to determining that the candidate prefix of one of the generated first prefix predicates matches an index key in the index, identifying that index key as the qualified index key for the first iteration, wherein the candidate prefix that matches the index key is used in a next iteration;

normalizing the character value and the literal value;

applying the original predicate with the normalized character value and the normalized literal value starting at the qualified index key identified in a last iteration to generate a result set for the query; and returning the result set.

2. The computer-implemented method of claim 1, further comprising operations for:

in response to determining that the prefix for a particular iteration contains all interesting characters of the literal value, returning the qualified index key for use in applying the original predicate; and in response to determining that the prefix for the particular iteration does not contain all interesting characters of the literal value, generating additional prefix predicates for a next group of elements of the literal value.

3. The computer-implemented method of claim 1, further comprising operations for:

performing an index probe to make the determination that the candidate prefix of one of the generated first prefix predicates matches the index key in the index.

4. The computer-implemented method of claim 1, wherein the index is a b-tree index and further comprising operations for:

using non-leaf level information to approximate filtering for the original predicate; and determining an access path based on the non-leaf level information.

5. The computer-implemented method of claim 1, further comprising operations for:

receiving a new query having a new predicate that compares a value having a combination of upper case and lower case elements; and performing a case insensitive search.

6. The computer-implemented method of claim 1, wherein the query includes any of a WHERE clause and an ON clause.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations comprising:

in response to receiving a query with an original predicate comparing a character value of a character data type to a literal value of a numeric data type, determining where to start a search in an index by:

for each of a number of iterations, generating prefix predicates for a prefix for that iteration; and processing the prefix predicates to identify a qualified index key in the index for that iteration; and wherein a first iteration comprises:

generating first prefix predicates for a first element of the literal value, wherein each of the first prefix predicates includes a candidate prefix of a plurality of candidate prefixes; and in response to determining that the candidate prefix of one of the generated first prefix predicates matches an index key in the index, identifying that index key as the qualified index key for the first iteration, wherein the candidate prefix that matches the index key is used in a next iteration;

normalizing the character value and the literal value;

applying the original predicate with the normalized character value and the normalized literal value starting at the qualified index key identified in a last iteration to generate a result set for the query; and returning the result set.

9. The computer program product of claim 8, wherein the program code is executable by the at least one processor to perform operations comprising:

in response to determining that the prefix for a particular iteration contains all interesting characters of the literal value, returning the qualified index key for use in applying the original predicate; and in response to determining that the prefix for the particular iteration does not contain all interesting characters of the literal value, generating additional prefix predicates for a next group of elements of the literal value.

10. The computer program product of claim 8, wherein the program code is executable by the at least one processor to perform operations comprising:

performing an index probe to make the determination that the candidate prefix of one of the generated first prefix predicates matches the index key in the index.

11. The computer program product of claim 8, wherein the index is a b-tree index and wherein the program code is executable by the at least one processor to perform operations comprising:

using non-leaf level information to approximate filtering for the original predicate; and determining an access path based on the non-leaf level information.

12. The computer program product of claim 8, wherein the program code is executable by the at least one processor to perform operations comprising:

receiving a new query having a new predicate that compares a value having a combination of upper case and lower case elements; and performing a case insensitive search.

13. The computer program product of claim 8, wherein the query includes any of a WHERE clause and an ON clause.

14. The computer program product of claim 8, wherein a Software as a Service (SaaS) is configured to perform the operations of the computer program product.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

in response to receiving a query with an original predicate comparing a character value of a character data type to a literal value of a numeric data type, determining where to start a search in an index by:

for each of a number of iterations, generating prefix predicates for a prefix for that iteration; and processing the prefix predicates to identify a qualified index key in the index for that iteration; and wherein a first iteration comprises:

generating first prefix predicates for a first element of the literal value, wherein each of the first prefix predicates includes a candidate prefix of a plurality of candidate prefixes; and in response to determining that the candidate prefix of one of the generated first prefix predicates matches an index key in the index, identifying that index key as the qualified index key for the first iteration, wherein the candidate prefix that matches the index key is used in a next iteration;

normalizing the character value and the literal value;

applying the original predicate with the normalized character value and the normalized literal value starting at the qualified index key identified in a last iteration to generate a result set for the query; and returning the result set.

16. The computer system of claim 15, wherein the operations further comprise:

in response to determining that the prefix for a particular iteration contains all interesting characters of the literal value, returning the qualified index key for use in applying the original predicate; and in response to determining that the prefix for the particular iteration does not contain all interesting characters of the literal value, generating additional prefix predicates for a next group of elements of the literal value.

17. The computer system of claim 15, wherein the operations further comprise:

performing an index probe to make the determination that the candidate prefix of one of the generated first prefix predicates matches the index key in the index.

18. The computer system of claim 15, wherein the index is a b-tree index and wherein the operations further comprise:

using non-leaf level information to approximate filtering for the original predicate; and determining an access path based on the non-leaf level information.

19. The computer system of claim 15, wherein the operations further comprise:

receiving a new query having a new predicate that compares a value having a combination of upper case and lower case elements; and performing a case insensitive search.

20. The computer system of claim 15, wherein a Software as a Service (SaaS) is configured to perform the operations of the computer system.

* * * * *